(12) United States Patent
Yueh

(10) Patent No.: US 9,317,222 B1
(45) Date of Patent: *Apr. 19, 2016

(54) CENTRALIZED CONTENT ADDRESSED STORAGE

(75) Inventor: Jedidiah Yueh, Irvine, CA (US)

(73) Assignee: EMC CORPORATION, Hopkinton, MA (US)

( * ) Notice: Subject to any disclaimer, the term of this patent is extended or adjusted under 35 U.S.C. 154(b) by 677 days.

This patent is subject to a terminal disclaimer.

(21) Appl. No.: 11/739,311

(22) Filed: Apr. 24, 2007

Related U.S. Application Data

(60) Provisional application No. 60/794,364, filed on Apr. 24, 2006.

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/067* (2013.01); *G06F 3/065* (2013.01)

(58) Field of Classification Search
CPC ........ G06F 3/067; G06F 3/065; G06F 3/0683
USPC ........................................................ 711/162
See application file for complete search history.

(56) References Cited

U.S. PATENT DOCUMENTS

| | | |
|---|---|---|
| 5,542,064 A | 7/1996 | Tanaka et al. |
| 5,642,505 A | 6/1997 | Fushimi |
| 5,764,972 A | 6/1998 | Crouse et al. |
| 6,212,512 B1 | 4/2001 | Barney et al. |
| 6,275,953 B1 | 8/2001 | Vahalia et al. |
| 6,496,944 B1 | 12/2002 | Hsiao et al. |
| 6,732,293 B1 | 5/2004 | Schneider |
| 6,795,966 B1 | 9/2004 | Lim et al. |
| 6,829,617 B2 | 12/2004 | Sawdon et al. |
| 6,865,655 B1 | 3/2005 | Andersen |

(Continued)

FOREIGN PATENT DOCUMENTS

| | | |
|---|---|---|
| CN | 200780009902.x | 6/2010 |
| CN | 200780009902.x | 5/2011 |

(Continued)

OTHER PUBLICATIONS

U.S. Appl. No. 11/968,040, filed Dec. 31, 2007, Jedidiah Yueh.

(Continued)

*Primary Examiner* — Sheng-Jen Tsai
(74) *Attorney, Agent, or Firm* — Workman Nydegger

(57) ABSTRACT

A centralized content addressed storage (CAS) application and a method for providing data protection are implemented by running a CAS application on a virtualization layer of a computer platform. The virtualization layer presents to the CAS application a normalized representation of a hardware subsystem of the computer platform, shielding the CAS application from actual hardware devices of the computer platform. A storage device of the computer platform is used to store a raw data set and the CAS application generates a backup data set of the raw data set. The CAS application stores the backup data set to an archive mechanism of the computer platform and can also restore and recover the raw data set in the event it is lost, corrupted or otherwise destroyed. Multiple CAS applications can be operated separately or together and they may be the same or differ.

19 Claims, 3 Drawing Sheets

(56) References Cited

U.S. PATENT DOCUMENTS

| | | | |
|---|---|---|---|
| 6,948,039 B2 | 9/2005 | Biessener et al. | |
| 7,093,086 B1* | 8/2006 | van Rietschote | 711/161 |
| 7,096,316 B1 | 8/2006 | Karr et al. | |
| 7,149,858 B1 | 12/2006 | Kiselev | |
| 7,277,905 B2 | 10/2007 | Randal et al. | |
| 7,343,459 B2 | 3/2008 | Prahlad et al. | |
| 7,346,263 B2 | 3/2008 | Honda | |
| 7,346,623 B2 | 3/2008 | Prahlad et al. | |
| 7,437,506 B1 | 10/2008 | Kumar et al. | |
| 7,469,323 B1* | 12/2008 | Tormasov et al. | 711/154 |
| 7,472,242 B1 | 12/2008 | Deshmukh et al. | |
| 7,500,001 B2 | 3/2009 | Tameshige et al. | |
| 7,669,020 B1 | 2/2010 | Shah et al. | |
| 7,747,831 B2* | 6/2010 | Yueh | G06F 11/1469 711/161 |
| 7,761,456 B1 | 7/2010 | Cram et al. | |
| 7,783,604 B1* | 8/2010 | Yueh | G06F 11/1453 707/640 |
| 7,788,220 B1* | 8/2010 | Auchmoody | G06F 17/30067 707/609 |
| 7,831,787 B1* | 11/2010 | Yueh | G06F 11/1456 711/161 |
| 7,991,783 B2* | 8/2011 | Flynn, Jr. | G06F 3/0605 707/759 |
| 8,626,741 B2* | 1/2014 | Vijayakumar | G06F 17/30091 707/713 |
| 2002/0069335 A1 | 6/2002 | Flynn, Jr. | |
| 2002/0069369 A1* | 6/2002 | Tremain | 713/201 |
| 2003/0177324 A1 | 9/2003 | Timpanaro-Perrotta | |
| 2003/0217038 A1 | 11/2003 | Kageyama et al. | |
| 2004/0172509 A1* | 9/2004 | Takeda et al. | 711/162 |
| 2004/0225659 A1* | 11/2004 | O'Brien et al. | 707/9 |
| 2005/0125513 A1 | 6/2005 | Sin-Ling Lam et al. | |
| 2005/0160243 A1 | 7/2005 | Lubbers et al. | |
| 2005/0235288 A1 | 10/2005 | Yamakabe et al. | |
| 2006/0053333 A1 | 3/2006 | Uhlmann et al. | |
| 2006/0059207 A1* | 3/2006 | Hirsch et al. | 707/201 |
| 2006/0074941 A1* | 4/2006 | Flynn | G06F 3/0605 |
| 2006/0184937 A1 | 8/2006 | Abels et al. | |
| 2007/0174566 A1* | 7/2007 | Kaneda et al. | 711/162 |
| 2007/0179999 A1* | 8/2007 | Kamei et al. | 707/204 |
| 2007/0180509 A1* | 8/2007 | Swartz et al. | 726/9 |
| 2007/0286575 A1* | 12/2007 | Oashi et al. | 386/95 |
| 2008/0013365 A1* | 1/2008 | Yueh | 365/149 |
| 2008/0215474 A1* | 9/2008 | Graham | 705/37 |
| 2008/0215796 A1* | 9/2008 | Lam et al. | 711/100 |
| 2008/0313371 A1* | 12/2008 | Kedem et al. | 710/68 |
| 2009/0222496 A1 | 9/2009 | Liu et al. | |
| 2009/0276771 A1 | 11/2009 | Nickolov et al. | |
| 2010/0275058 A1 | 10/2010 | Hashimoto et al. | |

FOREIGN PATENT DOCUMENTS

| | | |
|---|---|---|
| CN | 200780016805.3 | 4/2012 |
| CN | 201210422261.3 | 3/2015 |
| EP | 0774715 | 5/1997 |
| EP | 0899662 A1 | 3/1999 |
| EP | 07758941.4 | 6/2009 |
| EP | 07758941.4 | 5/2015 |
| JP | 2005-292865 | 10/2005 |
| JP | 2009-501704 | 4/2012 |
| WO | WO 99/09480 | 2/1999 |
| WO | WO 99/12098 | 3/1999 |
| WO | WO 02/37689 | 5/2002 |
| WO | WO 2006/017584 | 2/2006 |

OTHER PUBLICATIONS

U.S. Appl. No. 11/746,399, filed May 7, 2007, Jedidiah Yueh et al.
U.S. Appl. No. 11/747,567, filed May 11, 2007, Scott Ogata et al.
U.S. Appl. No. 11/772,183, filed Jun. 30, 2007, Jedidiah Yueh.
U.S. Appl. No. 11/688,203, Sep. 10, 2009, Office Action.
U.S. Appl. No. 11/968,040, Sep. 17, 2009, Office Action.
U.S. Appl. No. 11/746,399, May 14, 2009, Office Action.
U.S. Appl. No. 11/747,567, Sep. 30, 2009, Office Action.
U.S. Appl. No. 11/772,183, Sep. 15, 2009, Office Action.
U.S. Appl. No. 12/762,769, filed Apr. 19, 2010, Jedidiah Yueh.
U.S. Appl. No. 11/688,203, filed Mar. 19, 2007, Jedidiah Yueh.
U.S. Appl. No. 11/688,203, Mar. 3, 2010, Notice of Allowance.
U.S. Appl. No. 11/688,203, Mar. 24, 2010, Notice of Allowance.
PCT/US07/068661, Aug. 5, 2008, ISR with Written Opinion.
PCT/US07/064440, Feb. 11, 2008, ISR with Written Opinion.
U.S. Appl. No. 11/968,040, Mar. 9, 2010, Final Office Action.
U.S. Appl. No. 11/746,399, Dec. 14, 2009, Final Office Action.
U.S. Appl. No. 11/747,567, Feb. 24, 2010, Final Office Action.
U.S. Appl. No. 11/772,183, Feb. 24, 2010, Final Office Action.
U.S. Appl. No. 12/762,769, Jun. 23, 2010, Office Action.
U.S. Appl. No. 11/968,040, Sep. 3, 2010, Notice of Allowance.
U.S. Appl. No. 11/746,399, Aug. 5, 2010, Office Action.
U.S. Appl. No. 11/747,567, Sep. 8, 2010, Office Action.
U.S. Appl. No. 11/772,183, Jul. 27, 2010, Office Action.
U.S. Appl. No. 12/762,769, Oct. 26, 2010, Final Office Action.
U.S. Appl. No. 11/746,399, Jan. 19, 2011, Final Office Action.
U.S. Appl. No. 11/772,183, Dec. 23, 2010, Final Office Action.
Sack, "SQL Server 2005 T-SQL Recipes a Problem Solution Approach", pp. 683-716, 2006.
U.S. Appl. No. 11/746,399, Jul. 7, 2011, Notice of Allowance.
U.S. Appl. No. 11/747,567, Apr. 29, 2011, Final Office Action.
U.S. Appl. No. 11/772,183, Jun. 2, 2011, Office Action.
U.S. Appl. No. 11/747,567, Jun. 4, 2012, Office Action.
Office Action mailed Jul. 19, 2011 in JP2009-501704.
Office Action mailed Sep. 15, 2011 in CN200780009902.X.
Tooru Miyahara, the latest emulator guide by Vmware&QEMU, SoftwareDesign, book, Gijutsu-Hyohron Co. Ltd., Jul. 18, 2005.
U.S. Appl. No. 11/739,311, Sep. 13, 2011, Final Office Action.
U.S. Appl. No. 11/772,183, Dec. 1, 2011, Final Office Action.
U.S. Appl. No. 12/762,769, Apr. 15, 2011, Notice of Allowance.
Extended European Search Report dated Aug. 7, 2013 from European Patent Application No. 07762088.
Office Action dated Oct. 24, 2012 from U.S. Appl. No. 11/747,567, filed May 11, 2007.
Office Action dated Apr. 23, 2013 from U.S. Appl. No. 11/747,567, filed May 11, 2007.
Office Action dated Aug. 29, 2013 from U.S. Appl. No. 11/747,567, filed May 11, 2007.
Office Action dated Sep. 5, 2013 from U.S. Appl. No. 11/772,183, filed Jun. 30, 2007.
Office Action dated May 6, 2013 from U.S. Appl. No. 11/772,183, filed Jun. 30, 2007.
Office Action mailed Mar. 5, 2014 in CN 200780009902.x.
U.S. Appl. No. 11/747,567, Jan. 13, 2014, Office Action.
U.S. Appl. No. 11/772,183, Feb. 4, 2014, Office Action.
Kaczmarski et al., "Beyond backup toward storage management", IBM Systems Journal, vol. 42, No. 2, pp. 322-337, 2003, IBM.
Rahumed et al., "A Secure Cloud Backup System with Assured Deletion and Version Control", 2011 International Conference on Parallel Processing Workshops, pp. 160-167, 2011, IDDD.

\* cited by examiner

CENTRALIZED CONTENT ADDRESSED STORAGE

CROSS-REFERENCE TO RELATED APPLICATIONS

The present application claims the benefit of U.S. Provisional Application Ser. No. 60/794,364 filed Apr. 24, 2006 and entitled CENTRALIZED CONTENT ADDRESSED STORAGE, which application is incorporated herein by reference in its entirety.

BACKGROUND OF THE INVENTION

1. The Field of the Invention

The present invention relates to data storage and back-up solutions for archiving data and recovering data. More particularly, embodiments of the invention relate to software, hardware, systems, and methods for providing data protection in a manner that provides for high efficiency archiving and portability.

2. the Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. The customers of the data storage industry are more frequently demanding that not only is their data properly backed up but also that such data protection be done in a cost effective manner with a reduced cost per bit for stored data sets.

To address these demands, Content Addressed Storage (CAS) has been developed to provide a more cost effective approach to data backup and archiving. Generally, CAS applications involve a storage technique for content that is in its final form, i.e., fixed content, or that is not changed frequently. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The usage of CAS enables data protection systems to store, online, multi-year archives of backup data by removing storage of redundant data because complete copies of data sets do not have to be stored as long as that content is stored and available. The use of CAS removes the challenges of maintaining a centralized backup index and also provides a high level of data integrity. CAS-based backup and archive applications have also improved the usage network and data storage resources with better distribution of data throughout a multi-node data storage system.

CAS-based backup and archive applications are also desirable because multi-year or other large backup archives can be stored easily since only a single instance of any particular data object (i.e., content) is stored regardless of how many times the object or content is discovered with the data set being protected or backed up. With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system. While providing higher efficiency data storage, there are demands for providing CAS-based data storage systems in a more efficient and more easily managed manner.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

One aspect of the invention involves providing content addressed storage or CAS on virtualization. CAS deployments have previously been commodity server deployments, but embodiments of the invention provide a technique for providing a centralized CAS in anticipation of a potential shift in the storage industry toward centralized servers with external arrays rather than the use of commodity server grids. Such embodiments of the invention can be seen at least in FIGS. 1-4. Briefly, the invention combines two different technologies in order to create a centralized CAS system. First, the CAS system includes or uses a content addressed storage (CAS) application. Second, it includes a virtualization layer to shield the CAS application or instance from the actual hardware devices.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the exemplary embodiments or to specific hardware and storage mechanisms as it is useful for nearly any data storage arrangement in which archives of digital data, such as data volumes, are generated and maintained.

Figure 1:
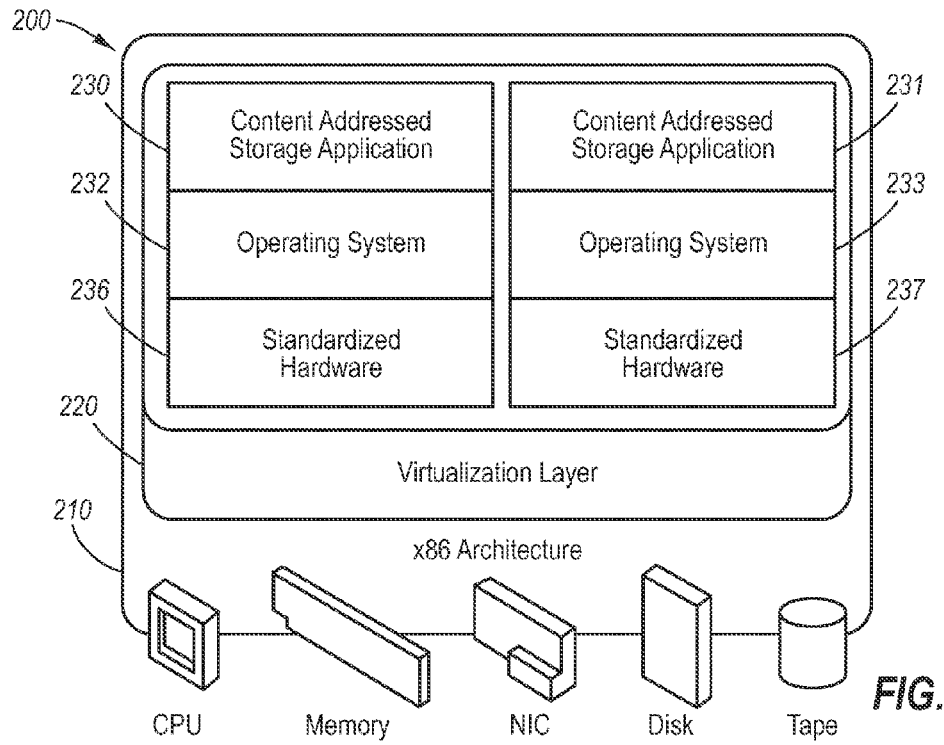
FIG. 1 illustrates a centralized content addressed storage system according to an embodiment of the invention using a virtualization layer to separate a CAS application and associated operating system from a computer architecture.

FIG. 1 illustrates a centralized CAS system 200 according to the invention. As shown, the centralized CAS system 200 is built on a computer platform 210 (such as a standard architecture such as the x86 architecture or the like) that includes a number of resources such as CPUs, memory, network devices, disk, and tape mechanisms. A virtualization layer 220 is provided to manage access to or "virtualize" the architecture 210 into a uniform pool and separate the hardware of this pool from one or more virtual machines (i.e., the system 200 is shown with 2 such virtual or guest machines running on the virtualization layer 220—but more such machines may be run). The virtualization layer 220 presents a virtualized representation 236, 237 to an operating system 232, 233 of each virtual or guest machine. The operating systems 232, 233 may also vary and may include for example, Windows, Linux, Novell, Solaris, and other operating systems such as FreeBSD and the like. Content addressed storage applications 230, 231 are provided and associated with the instances of operating systems 232, 233 and use the virtual systems 236, 237 to process raw data to create more space efficient versions (i.e., with a data object typically only being stored once and matched with a unique identifier) that are stored to an archive mechanism in the architecture 210 (such as a tape device or a disk or optical device).

Generally, content-addressed storage (CAS) includes a method of providing access to fixed or specific data content by assigning it a permanent place on disk or other data storage. When a data object is stored in CAS, the object is given a name or identifier (such as a hash number) that uniquely identifies it and that also specifies the storage location, and this type of address is called a "content address."

Figure 2:
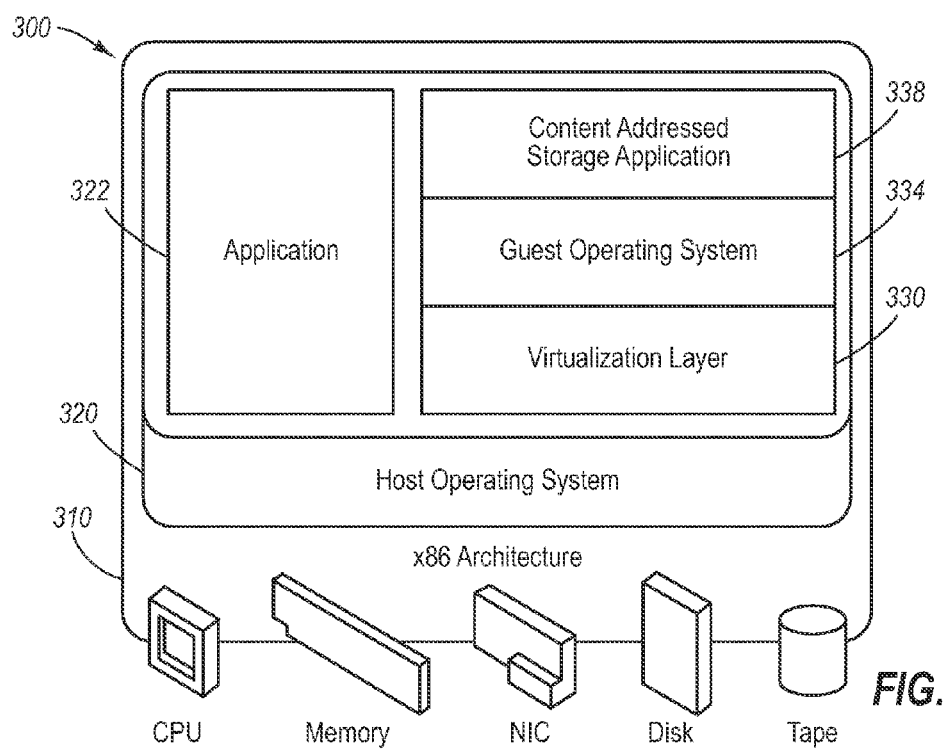
FIG. 2 is another CAS-based storage system of the invention that is similar to that of FIG. 2 but arranged as a hosted architecture.

FIG. 2 illustrates an alternative arrangement for a centralized CAS system 300 according to the invention. As with system 200, the system 300 includes a set of computer hardware or a particular architecture 310 that is pooled by a virtualization layer 330 and is shielded from a high efficiency storage application 338 (i.e., a CAS application). However, in this case, the virtual machine includes the virtualization layer 330 and the virtual machine is installed and run as an application, e.g., similar to application 322. The virtualization layer 330 relies on a host OS 320 for device support and physical resource management of the architecture 310 and presents a guest operating system 334 to the storage application 338.

Figure 3:
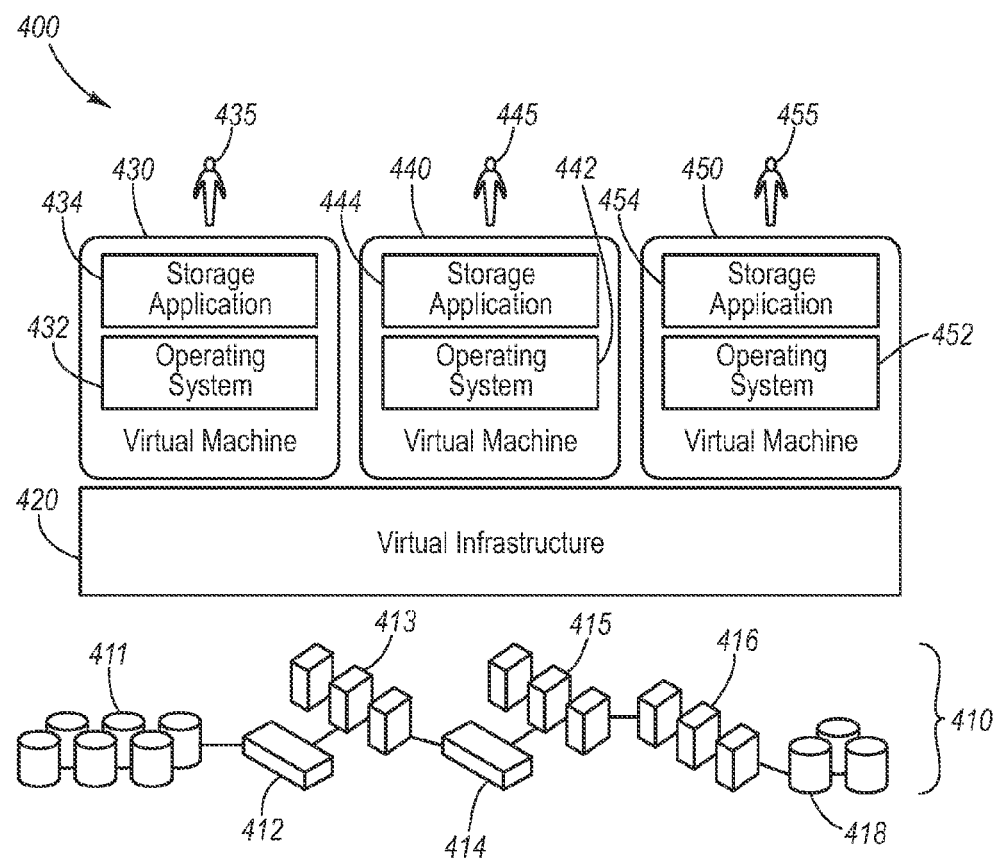
FIG. 3 is a yet another centralized content addressed storage system of the invention illustrating the use of the virtual infrastructure or layer to allow multiple virtual machines (and CAS instances) to access a computer resources pool including devices used for providing archives of data sets.

FIG. 3 illustrates yet another centralized CAS system 400 according to the present invention. The CAS system 400 includes a computer resources pool or computer architecture/platform 410 that includes the hardware and associated software available in the system 400. The pool 410 includes storage 411, 418 that may include nearly any type of storage device for digital data such as tape-based storage devices and systems and disk and optical devices. The pool 410 also includes networks/network devices 412, 414 and a number of servers or other computing devices 413, 415, 416 (which may also be used as data storage in some cases with storage 411, 418 being used for archive or backup storage).

Upon the platform 410, a virtualization infrastructure 420 is provided for connecting the resources in pool 410 to users (or to a business/enterprise) 435, 445, 455. The virtual infrastructure 420 provides a dynamic mapping of the resources in pool 410 to one or more virtual machines 430, 440, 450. Each of the virtual machines 430, 440, 450 runs an operating system 432, 442, 452 and a number of instances of CAS applications 434, 444, 454. The CAS applications 434, 444, 454 may be the same applications in each virtual machine or differ in one or more of the machines 430, 440, 450. The CAS applications may comprise the systems and methods disclosed in U.S. Pat. No. 6,704,730 (hereinafter the '730 patent), which is herein incorporated by reference, or other products implementing aspects of the '730 patent.

Each storage application 434, 444, 454 may be ported to data that has been archived according to its particular CAS methods and may use its recovery functionality to recover or restore such data on a hardware subsystem within pool 410 provided by virtual infrastructure as being capable of supporting the virtual machine 430, 440, 450 and its associated virtual storage system. For example, CAS versions (e.g., content addressed data objects) of a data set stored in storage 411 or 418 may be accessed by a virtual machine 430, 440, 450 via one or more of the servers 413, 415, 416 (and/or other resources in pool 410) to recover a desired set of data, such as based on a recovery request from a user 435, 445, 455.

Figure 4:
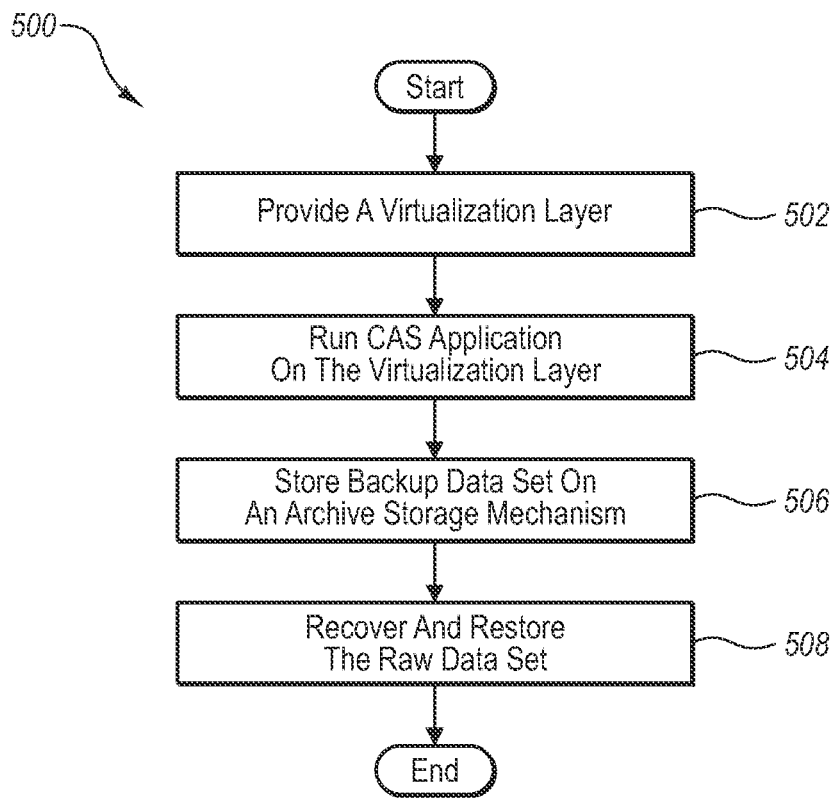
FIG. 4 depicts a method for providing data protection in a computer architecture according to one embodiment of the invention.

With reference now to FIG. 4, a method 500 is illustrated for providing data protection in a computer architecture. A typical computer architecture in which the method 400 may be practiced includes a storage device to which a raw data set is stored and a hardware subsystem. The computer architecture may additionally include an archive mechanism. The process 500 begins by providing 502 a virtualization layer on the computer architecture. A CAS application can then be operated or run 504 on the virtualization layer to create a backup data set from the raw data set, the virtualization layer presenting a representation of a set of components of the hardware subsystem to the CAS application. In some embodiments, the backup data set is stored 506 on an archive mechanism, which may constitute part of the hardware subsystem or may be independent of the hardware subsystem. Finally, if the raw data set is lost, corrupted or otherwise destroyed, the CAS application can recover 508 and restore the raw data set based on the backup data set.

As discussed above, the virtualization layer or infrastructure (such as those shown in FIGS. 1-3) may take a number of forms to practice the invention. In one embodiment, however, the high efficiency storage application may be run on VMware virtualization products such as VMware ESX or GSX (or similar products). Virtualization products such as VMware ESX are relatively well known and understood by those skilled in the art and a full discussion is not believed required here to describe the invention. In other embodiments, the virtualization layer is provided by the virtualization product Xen 3.0 (or other versions) from XenSource, and in other embodiments, virtualization products from Microsoft Corporation and/or Intel Corporation are used to provide the virtualization layer described herein.

As discussed above, CAS applications of the centralized CAS systems of FIGS. 1-3 may vary to practice the invention. In some embodiments, multiple "virtual" CAS instances can all operate separately as independent instances. For example, the instances 230, 231 in FIG. 1 may operate independently as can storage application instances 434, 444, 454 in FIG. 3. However, in other embodiments or implementations of the present invention, two or more CAS instances may operate together (e.g., in a coordinated manner) as a single CAS system. For example, the virtual CAS instances 230 and 231 may cooperate to provide a single CAS system and two or more of the applications 434, 444, 454 may operated together to provide a single CAS system. Additionally, a single, scalable CAS system may not only span virtual CAS instances on a single piece of hardware or architecture but such a CAS system may also span both "real" CAS instances on individual hardware as well as other "virtual" CAS instances on other hardware running virtualization hardware. In effect, the multi-instance CAS system can be completely heterogeneous in nature.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

What is claimed is:

1. A method for providing data protection, comprising:
providing a virtualization layer on a computer architecture comprising a storage device storing a raw data set and a hardware subsystem;
running a first instance of a content addressed storage (CAS) application on the virtualization layer to create a backup data set from the raw data set, wherein the virtualization layer shields the content addressed storage application from the hardware subsystem by presenting a representation of a set of components of the hardware subsystem to the first instance of the CAS application;
running a second instance of the CAS application on the virtualization layer or on another virtualization layer, wherein both the first instance of the CAS application and the second instance of the CAS application are configured for backup operations and recovery operations; and
storing the backup data set to the representation of the set of components, wherein the backup data set is stored in an archive mechanism, and wherein data in the backup data set stored in the archive mechanism and created by the first instance of the CAS application can be recovered and restored by the second instance of the CAS application,
wherein the first instance of the CAS application and the second instance of the CAS application are configurable to operate as independent instances and are configurable to operate together as a single CAS system to backup the same raw data set.

2. The method of claim 1, further comprising running an additional CAS application on the virtualization layer to create an additional backup data set from the raw data set, wherein the virtualization later presents a representation of another set of components of the hardware subsystem to the additional CAS application.

3. The method of claim 2, wherein the CAS application and the additional CAS application differ from each other.

4. The method of claim 1, wherein the virtualization layer and the first instance of the CAS application constitute a virtual machine installed and run on the computer architecture as an application, and wherein the virtualization layer relies on a host operating system for device support and physical resource management of the computer architecture.

5. The method of claim 4, further comprising the virtualization layer presenting a guest operating system to at least one of the first CAS application and the additional CAS application.

6. The method of claim 1, wherein the computer architecture further comprises an archive mechanism, the method further comprising storing the backup data set to the archive mechanism.

7. The method of claim 6, wherein the archive mechanism comprises one or more of:
a tape device;
a disk device; and
an optical device.

8. The method of claim 1, further comprising using at least one of the first instance of the CAS application and the second instance of the CAS application to generate a recovered version of the raw data set on the hardware subsystem based on the backup data set.

9. The method of claim 8, further comprising, prior to generating the recovered version of the raw data set on the hardware subsystem, receiving a recovery request from a user.

10. A method for centralized content addressed storage, the method comprising:
- providing a virtualization layer on a computer architecture that includes a storage device for storing raw data including point-in-time raw data;
- operating a storage system that includes a first instance of a storage application and a second instance of the storage application, the first instance of the storage application including a first content storage addressed storage system on the virtualization layer;
- operating a second instance of the storage application including a second content storage addressed storage system on the virtualization layer or on another virtualization layer, wherein the first and second instances of the storage application are configurable to operate independently in the computer architecture and are configurable to operate together as a single CAS system in the computer architecture, wherein both the first instance of the storage application and the second instance of the storage application are configured for backup operations and recovery operations;
- presenting a virtualized representation of the computer architecture to the first instance of the storage application with the virtualization layer, wherein the first storage application is shielded from the computer architecture by the virtualization layer;
- processing the raw data to create backup data that includes space efficient versions of the raw data with each of the first and second instances of the storage application;
- storing the space efficient versions of the raw data to an archive mechanism in the computer architecture,
- wherein both the first and the second instances of the storage application are operable to recover and restore the space efficient versions of the raw data stored in the archive mechanism created by either or both of the first and the second instances of the storage application when the first and second instances of the storage application operate independently and when the first and second instances of the storage application operate cooperatively as the single CAS application, and
- wherein the storage system is configured to span both real and virtual environments.

11. The method of claim 10, wherein processing the raw data to create space efficient versions of the raw data further comprises:
- storing a particular data object a single time;
- matching a unique identifier with the particular data object; and
- providing the data object with a content address.

12. The method of claim 10, wherein providing a virtualization layer on a computer architecture further comprises pooling the computer architecture.

13. The method of claim 10, wherein at least one of the first and second instances of the storage application comprises a virtual machine running on the virtualization layer and wherein the virtualization layer presents a virtualized representation of the computer architecture to an operating system of the virtual machine.

14. The method of claim 10, wherein at least one of the first and second instances of the storage application comprises a virtual machine that is installed as an application and relies on a host operating system of a host and presents a guest operating system to the virtual machine.

15. The method of claim 10, wherein the computer architecture comprises networks and/or network devices and wherein versions of a data set stored on the resources can be accessed by any of the one or more virtual machines.

16. The method of claim 15, wherein the virtualization layer comprises a virtual infrastructure that connects resources in the computer architecture to users and wherein the virtual infrastructure provides a dynamic mapping of the resources to one or more virtual machines.

17. The method of claim 15, wherein one instance of the storage application is ported to raw data that has been archived according to storage methods of that instance of the storage application.

18. The method of claim 15, further comprising recovering a particular version of a data set based on a request from a user.

19. A content addressed storage system, comprising:
- a storage system that includes a first instance of a content addressed storage (CAS) application and a second instance of the CAS application;
- the first instance of the CAS application provided on a virtualization layer on a first hardware subsystem, wherein the virtualization layer shields the first instance of the CAS application from the first hardware subsystem by presenting a set of components of the first hardware subsystem to the first instance of the CAS application; and
- a second instance of the CAS application provided on a second virtualization layer on a second hardware subsystem, wherein the second virtualization layer shields the second instance of the CAS application from the second hardware subsystem by presenting a set of components of the second hardware subsystem to the second instance of the CAS application,
- wherein the first hardware subsystem and the second hardware subsystem are subsystems of a hardware system,
- wherein the first and second instances of the CAS system are configurable to operate as independent instances and are configurable to operate together as a single CAS system to create a backup data set from a raw data set, wherein the backup data set is a space efficient version of the raw data set and is associated with both the first and the second instances of the CAS application,
- wherein the backup data set stored in storage includes data from both the first and the second instances of the CAS application and wherein the backup data set can be recovered and restored by either or both the first and second instances of the CAS application when the first and second instances of the CAS application are operating as the single CAS system and when the first and second instances of the CAS application are operating as independent instances,
- wherein the first instance of the CAS application and the second instance of the CAS application are configured for backup operations and recovery operations and wherein the storage system is heterogeneous and configurable to span both real and virtual environments.

* * * * *